(12) United States Patent
Nakamura et al.

(10) Patent No.: US 10,739,978 B2
(45) Date of Patent: Aug. 11, 2020

(54) SETTING DEVICE, LIGHTING SYSTEM, METHOD FOR SETTING UP COMMUNICATION CONFIGURATION IN LIGHTING FIXTURE, AND RECORDING MEDIUM

(71) Applicant: PANASONIC INTELLECTUAL PROPERTY MANAGEMENT CO., LTD., Osaka (JP)

(72) Inventors: Shigeo Nakamura, Osaka (JP); Tomokazu Yamamoto, Osaka (JP); Kentaro Yamauchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 16/224,453

(22) Filed: Dec. 18, 2018

(65) Prior Publication Data

US 2019/0196704 A1 Jun. 27, 2019

(30) Foreign Application Priority Data

Dec. 21, 2017 (JP) ................................ 2017-244662

(51) Int. Cl.
*G06F 3/0484* (2013.01)
*G06F 3/0485* (2013.01)
(Continued)

(52) U.S. Cl.
CPC ........ *G06F 3/04847* (2013.01); *G06F 1/1694* (2013.01); *G06F 3/016* (2013.01);
(Continued)

(58) Field of Classification Search
CPC .... G06F 3/04847; G06F 3/0485; G06F 3/167; G06F 3/0346; G06F 3/016; H05B 37/0272
See application file for complete search history.

(56) References Cited

U.S. PATENT DOCUMENTS

2010/0205563 A1* 8/2010 Haapsaari ........... G06F 3/04883
715/825
2013/0313977 A1* 11/2013 Murakami ............. H05B 47/16
315/153
(Continued)

FOREIGN PATENT DOCUMENTS

JP 2014-032807 A 2/2014
JP 2014-053884 A 3/2014
(Continued)

*Primary Examiner* — Anil K Bhargava
(74) *Attorney, Agent, or Firm* — McDermott Will & Emery LLP

(57) ABSTRACT

A setting device includes: a communication circuit which communicates with a target lighting fixture in which a communication configuration is to be set up among lighting fixtures; a display which displays layout information of the lighting fixtures; a detector which detects a direction of movement of the setting device inside of a building, and an amount of the movement of the setting device; and a controller which causes the display to display, on the layout information, a position of the setting device derived based on the direction and the amount of the movement of the setting device. The controller determines whether the position of the setting device is within a predefined area, based on a location of the target lighting fixture, and sets up the communication configuration in the target lighting fixture via the communication circuit when the position of the setting device is within the predefined area.

24 Claims, 13 Drawing Sheets

(51) Int. Cl.
*G06F 3/16* (2006.01)
*G06F 3/0346* (2013.01)
*G06F 3/01* (2006.01)
*G06F 1/16* (2006.01)
*H05B 47/19* (2020.01)

(52) U.S. Cl.
CPC .......... *G06F 3/0346* (2013.01); *G06F 3/0485* (2013.01); *G06F 3/167* (2013.01); *H05B 47/19* (2020.01)

(56) References Cited

U.S. PATENT DOCUMENTS

| | | | | |
|---|---|---|---|---|
| 2014/0103814 | A1* | 4/2014 | Both | H05B 47/105 315/153 |
| 2014/0309963 | A1* | 10/2014 | Tsukamoto | G01C 21/206 702/150 |
| 2015/0038165 | A1* | 2/2015 | Tuo | H05B 47/19 455/456.1 |
| 2016/0056629 | A1* | 2/2016 | Baker | H04W 4/029 700/276 |
| 2017/0013697 | A1* | 1/2017 | Engelen | H05B 47/19 |
| 2017/0026119 | A1* | 1/2017 | Raj | H04B 10/1149 |

FOREIGN PATENT DOCUMENTS

| | | |
|---|---|---|
| JP | 2014-078398 A | 5/2014 |
| JP | 2015-065132 A | 4/2015 |
| JP | 2017-507453 A | 3/2017 |

\* cited by examiner

SETTING DEVICE, LIGHTING SYSTEM, METHOD FOR SETTING UP COMMUNICATION CONFIGURATION IN LIGHTING FIXTURE, AND RECORDING MEDIUM

CROSS REFERENCE TO RELATED APPLICATION

This application claims the benefit of priority of Japanese Patent Application Number 2017-244662 filed on Dec. 21, 2017, the entire content of which is hereby incorporated by reference.

BACKGROUND

1. Technical Field

The present disclosure relates to a setting device which sets up a communication configuration in a lighting fixture, a lighting system which includes the setting device, a method for setting up a communication configuration in a lighting fixture, and a recording medium.

2. Description of the Related Art

Conventionally, a lighting system which includes lighting fixtures, a lighting controller which controls the lighting fixtures, and a mobile device has been known (for example, see Japanese Unexamined Patent Application Publication (Translation of PCT Application) No. 2017-507453).

SUMMARY

In such a lighting system, lighting fixtures and lighting controllers are disposed in a building, and thereafter a communication configuration such as pairing is set up in each of the lighting fixtures using a mobile device. However, during the operation regarding such a communication configuration, a user may accidentally set up the communication configuration in a lighting fixture which is not a target lighting fixture in which the communication configuration is to be set up.

In view of this, the present disclosure is to provide, for instance, a setting device which can reliably set up a communication configuration in a target lighting fixture in which the communication configuration is to be set up.

A setting device according to an aspect of the present disclosure is a setting device which sets up a communication configuration in each of lighting fixtures disposed inside of a building, the setting device including: a communication circuit which communicates with a target lighting fixture in which the communication configuration is to be set up, among the lighting fixtures; a display which displays layout information of the lighting fixtures; a detector which detects a direction of movement of the setting device inside of the building, and an amount of the movement of the setting device; and a controller which causes the display to display, on the layout information displayed on the display, a position of the setting device derived based on the direction of the movement and the amount of the movement of the setting device. The controller determines whether the position of the setting device is within a predefined area that is defined based on a location of the target lighting fixture, and sets up the communication configuration in the target lighting fixture via the communication circuit when the position of the setting device is within the predefined area.

A lighting system according to an aspect of the present disclosure includes: lighting fixtures disposed inside of a building; lighting controllers which control the lighting fixtures; and a setting device which sets up a communication configuration in each of the lighting fixtures and the lighting controllers. The setting device includes: a communication circuit which communicates with a target lighting fixture in which the communication configuration is to be set up among the lighting fixtures; a display which displays layout information of the lighting fixtures; a detector which detects a direction of movement of the setting device inside of the building, and an amount of the movement of the setting device; and a controller which causes the display to display a position of the setting device derived based on the direction of the movement and the amount of the movement of the setting device. The controller determines whether the position of the setting device is within a predefined area that is defined based on a location of the target lighting fixture, and sets up the communication configuration in the target lighting fixture via the communication circuit when the position of the setting device is within the predefined area. The target lighting fixture in which the communication configuration is set up is paired with a lighting controller which is a pairing partner among the lighting controllers.

A method for setting up a communication configuration in each of lighting fixtures according to an aspect of the present disclosure is a method for setting up, using a setting device, a communication configuration in each of lighting fixtures disposed inside of a building, the method including: displaying layout information of the lighting fixtures on the setting device; detecting a direction of movement of the setting device inside of the building, and an amount of the movement of the setting device; deriving a position of the setting device, based on the direction of the movement and the amount of the movement of the setting device, and displaying, on the setting device, the position of the setting device derived; determining whether the position of the setting device is within a predefined area that is defined based on a location of a target lighting fixture in which the communication configuration is to be set up among the lighting fixtures; and setting up the communication configuration in the target lighting fixture using the setting device after it is determined that the position of the setting device is within the predefined area.

A recording medium according to an aspect of the present disclosure is a non-transitory computer-readable recording medium storing a program for causing a computer to execute the method for setting up the communication configuration in each of the lighting fixtures.

A communication configuration can be reliably set up in a target lighting fixture in which the communication configuration is to be set up.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

[Circumstances which have Led to the Present Disclosure]

Figure 1:
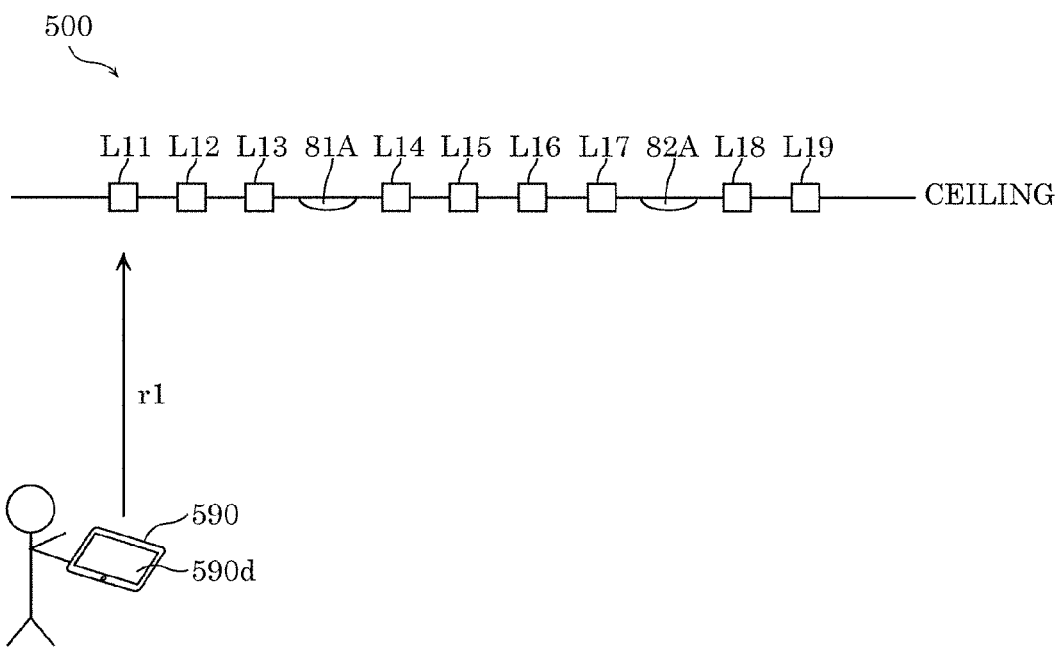
FIG. 1 is a schematic diagram illustrating a lighting system according to a comparative example.

First, the circumstances which have led to the present disclosure are to be described with reference to FIGS. 1 and 2. FIG. 1 is a schematic diagram illustrating lighting system 500 according to a comparative example.

Lighting system 500 includes lighting fixtures L11 to L19, lighting controllers 81A and 82A, and setting device 590 such as a tablet terminal. A communication configuration such as pairing is not yet set up, immediately after lighting fixtures L11 to L19 and lighting controllers 81A and 82A are disposed on the ceiling of a building, for instance, so that lighting controllers 81A and 82A cannot control lighting fixtures L11 to L19. Thus, a communication configuration is to be set up in each of lighting fixtures L11 to L19 using setting device 590.

Figure 2:
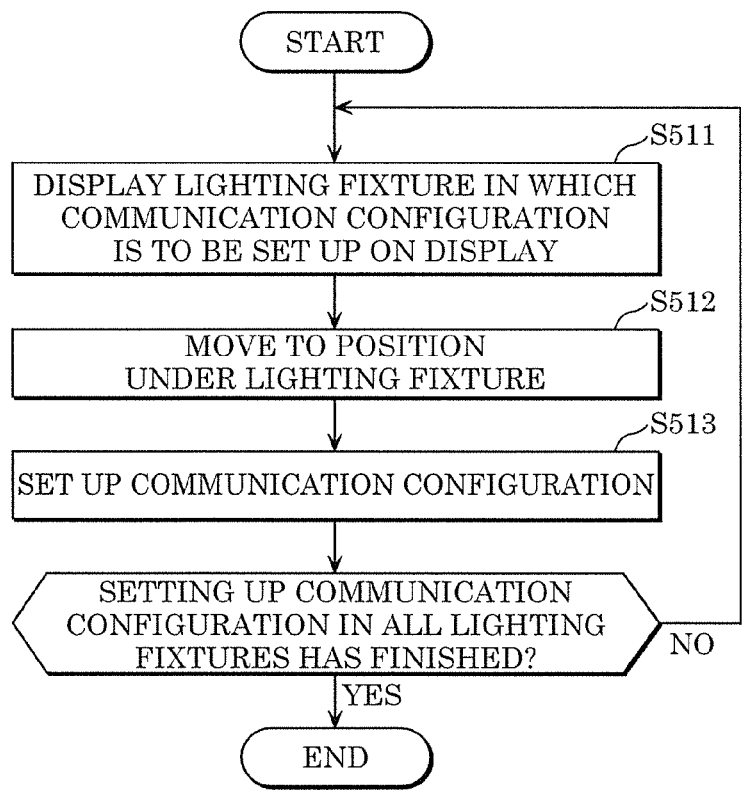
FIG. 2 is a flowchart illustrating a method for setting up a communication configuration in lighting fixtures according to the comparative example.

This communication configuration is set up through the steps illustrated in FIG. 2, for example. FIG. 2 is a flowchart illustrating a method for setting up a communication configuration in each of lighting fixtures L11 to L19 according to the comparative example.

First, a target lighting fixture (for example, lighting fixture L11) in which a communication configuration is to be set up is displayed on display 590d of setting device 590 (S511). Next, a user moves to a position immediately under lighting fixture L11, while holding setting device 590 (S512). Next, setting device 590 sets up the communication configuration in lighting fixture L11 using a signal that setting device 590 transmits by radio r1 (S513). Setting up the communication configuration in each of lighting fixtures L11 to L19 finishes by performing steps S511 to S513 for all lighting fixtures L11 to L19.

However, according to the method for setting up a communication configuration mentioned above, the user may accidentally move to a position under a lighting fixture (for example, lighting fixture L12) which is not the target lighting fixture, and set up the communication configuration.

According to the present embodiment, the setting device determines whether the position of the setting device matches the position of the target lighting fixture, and if the positions match, the setting device sets up the communication configuration. Accordingly, the communication configuration can be reliably set up in the target lighting fixture.

The following describes a setting device, a lighting system, a method for setting up a communication configuration in each of lighting fixtures, and a recording medium according to embodiments. Note that the embodiments described below each show a particular example of the present disclosure. Thus, the numerical values, shapes, materials, elements, the arrangement and connection of the elements, and the like described in the following embodiments are examples, and thus are not intended to limit the present disclosure. Therefore, among the elements in the following embodiments, elements not recited in any of the independent claims defining the most generic concept of the present disclosure are described as arbitrary elements.

Note that the drawings are schematic diagrams, and do not necessarily provide strictly accurate illustration. Further, the same numeral is given to substantially the same structural member throughout the drawings, and a redundant description thereof may be omitted or simplified.

Embodiment 1

[1. Entire Configuration of Lighting System]

The entire configuration of lighting system 100 according to Embodiment 1 is to be described with reference to FIGS. 3A and 3B.

Figure 3A:
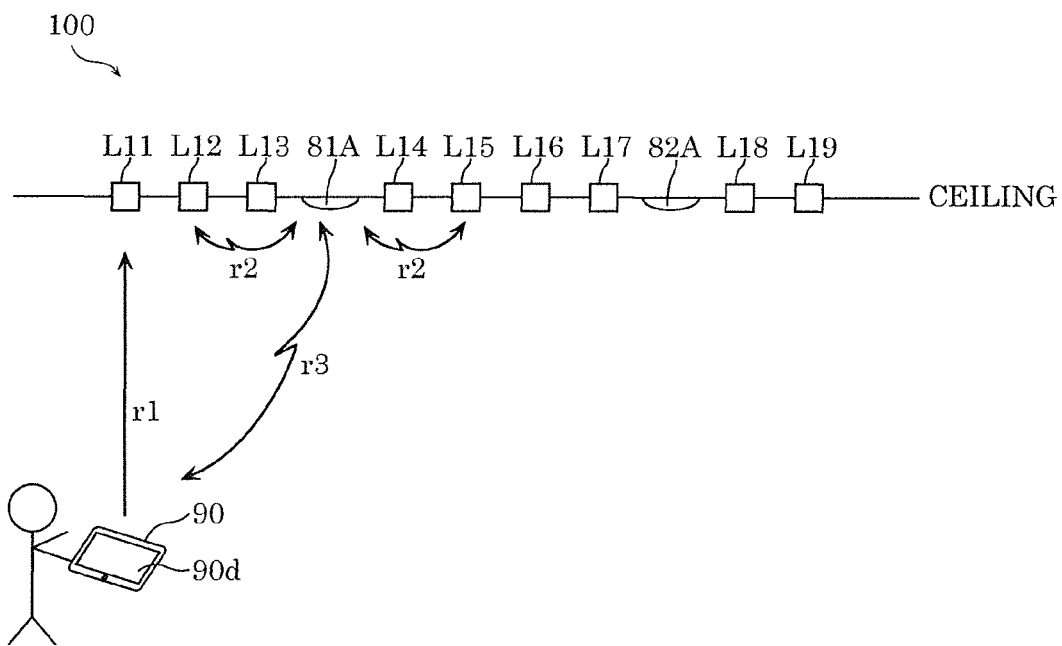
FIG. 3A is a schematic diagram illustrating lighting fixtures, lighting controllers, and a setting device which are included in a lighting system according to Embodiment 1.

FIG. 3A illustrates lighting fixtures, lighting controllers 81A and 82A, and setting device 90 which are included in lighting system 100 according to Embodiment 1. FIG. 3B illustrates a layout of lighting system 100 when viewed from above.

Lighting system 100 includes lighting fixtures L11 to L19, L21 to L29, L31 to L39, L41 to L49, L51 to L59, L61 to L69, and L71 to L79, lighting controllers 81A and 82A, and setting device 90. Note that in FIG. 3B, some of the reference numerals of the lighting fixtures are omitted.

Figure 3B:
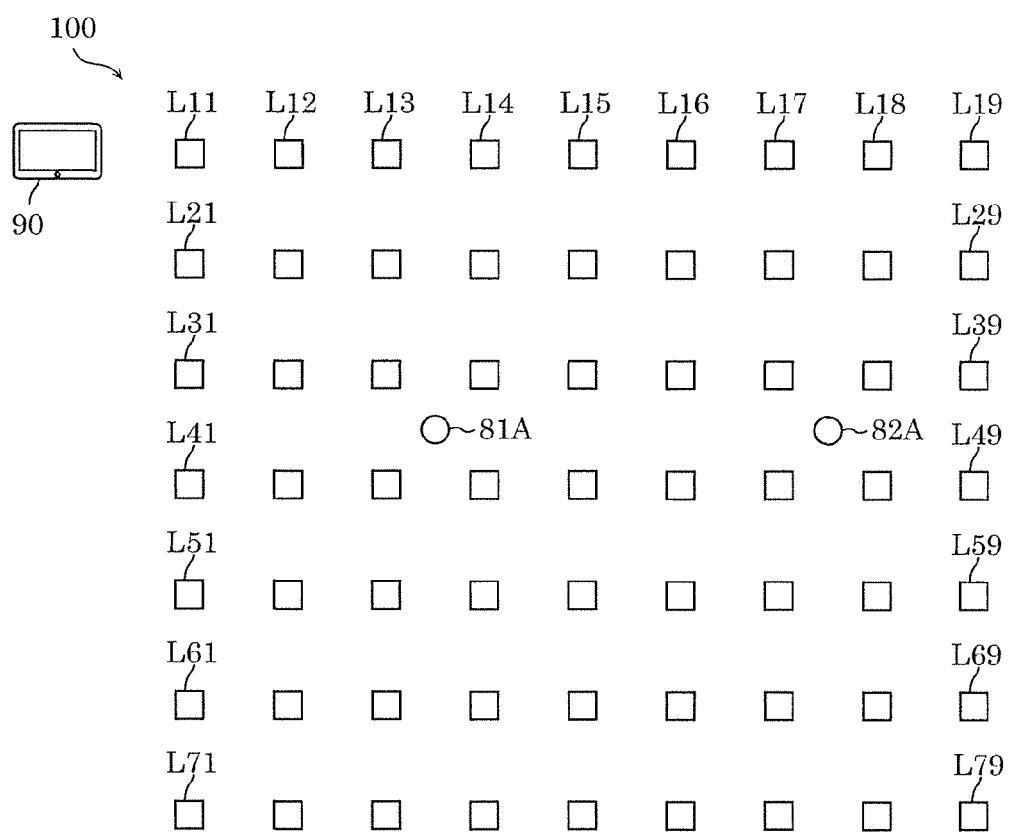
FIG. 3B illustrates a layout of the lighting system according to Embodiment 1 when viewed from above.

FIG. 3A illustrates 9 lighting fixtures L11 to L19, and FIG. 3B illustrates 63 lighting fixtures L11 to L79. Nevertheless, the drawings show mere examples, and in practice, 100 or more lighting fixtures may be disposed inside of a building. Hereinafter, some or all of lighting fixtures L11 to L79 may be referred to as lighting fixtures L. Lighting fixtures L are disposed in a matrix, as illustrated in FIG. 3B. Lighting controllers 81A and 82A are disposed among two or more lighting fixtures L.

Lighting fixtures L can communicate with lighting controllers 81A and 82A by radio r2. As a method of communication by radio r2, a method such as specified low power radio for which a frequency in a 920 MHz band or a 2.4 GHz band is used, Zigbee (registered trademark), Bluetooth (registered trademark), or WiFi (registered trademark) is used.

Setting device 90 and lighting controllers 81A and 82A can communicate with each other by radio r3. As a method of communication by radio r3, methods same as or similar to the methods of communication by radio r2 are used.

Setting device 90 can communicate with lighting fixtures L by directional radio r1 such as infrared-ray communication. For example, setting device 90 is brought close to lighting fixture L11, and transmits a signal towards lighting fixture L11 by radio r1, so that setting device 90 can transmit information only to target lighting fixture L11. Lighting fixtures L are disposed on the ceiling at intervals of 5 m, for example, so as to be able to separately receive signals transmitted by setting device 90. Note that radio r1 is not limited to infrared-ray communication, and may be directional radio such as laser beam communication or near field communication (NFC).

In lighting system 100, a communication configuration can be separately set up in each of lighting fixtures L, using signals that setting device 90 transmits by radio r1. Note that a communication configuration in the present embodiment means to set information to be used for pairing and mapping in each of lighting fixtures L. Pairing is to mutually store a communication address of a communication partner. Such pairing allows receiving information transmitted by the partner, and for example, lighting controller 81A can control light emission of lighting fixture L11. Mapping means to associate layout information of lighting fixtures L and communication addresses of lighting fixtures L. Such mapping allows controlling light emission of lighting fixtures L according to the spots where lighting fixtures L are disposed.

[2. Configuration of Lighting System]

The following describes lighting fixture L, lighting controllers 81A and 82A, and setting device 90 which are included in lighting system 100.

Figure 3C:
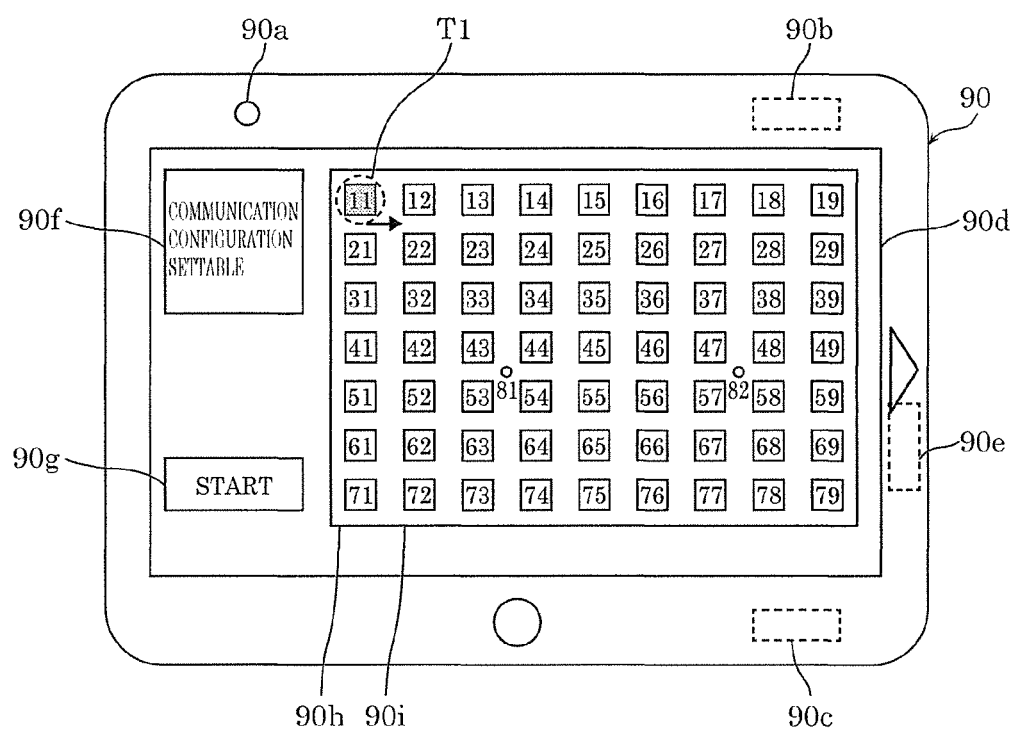
FIG. 3C is a schematic plan view of the setting device according to Embodiment 1.
Figure 4:
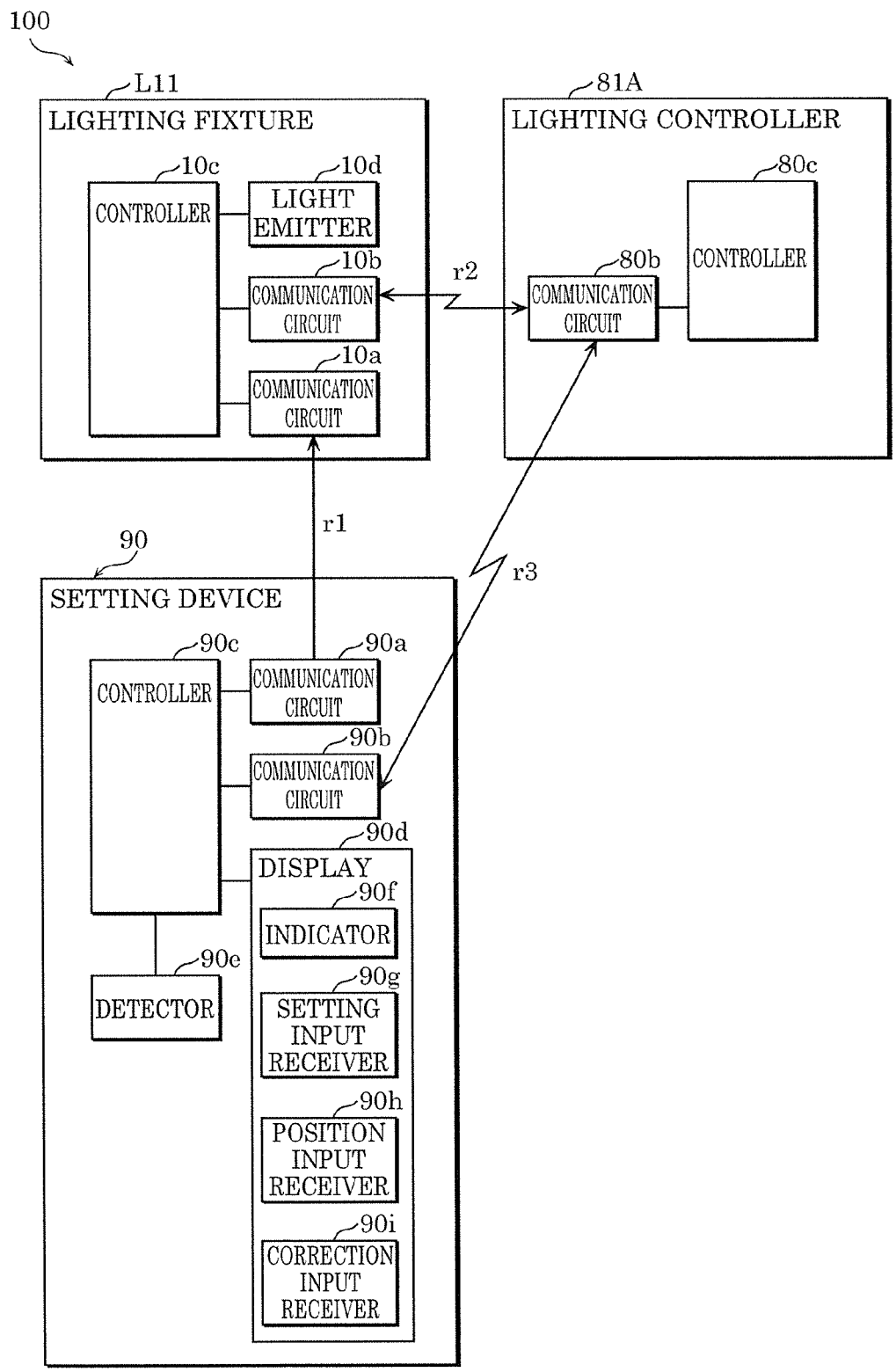
FIG. 4 is a block diagram illustrating a control configuration of one of the lighting fixtures, one of the lighting controllers, and the setting device according to Embodiment 1.

FIG. 3C is a schematic plan view of setting device 90. FIG. 4 is a block diagram illustrating control configuration of lighting fixture L, lighting controller 81A, and setting device 90. Note that FIG. 4 illustrates lighting fixture L11 as a representative example among lighting fixtures L11 to L79, and also lighting controller 81A as a representative example among lighting controllers 81A and 82A.

Lighting fixture L11 is a ceiling light, for example, and is disposed on, for instance, the ceiling which is an example of a construction material of a building. Lighting fixture L11 includes controller 10c, and light emitter 10d and communication circuits 10a and 10b which are connected to controller 10c, as illustrated in FIG. 4.

Communication circuit 10a is an infrared-ray receiver, for example, and receives signals transmitted by setting device 90 by radio r1. Communication circuit 10b includes an antenna, a wireless module, and others, and communicates with lighting controller 81A by radio r2.

Light emitter 10d includes plural light emitting diodes which emit white light, red light, green light, or blue light, for example.

Controller 10c controls dimming and/or color tuning of light emitter 10d. Controller 10c includes, for instance, a central processing unit (CPU), random access memory (RAM), and read only memory (ROM). The communication address of lighting fixture L11 is stored in controller 10c. Examples of the communication address include the media access control address (MAC address) and a unique device identifier (UDID) of lighting fixture L11. Controller 10c receives information regarding a communication configuration from setting device 90 via communication circuit 10a, and thereafter transmits the own communication address to lighting controller 81A which is a pairing partner via communication circuit 10b.

Lighting controller 81A controls light emission of lighting fixture L11. Lighting controller 81A includes controller 80c, and communication circuit 80b connected to controller 80c, as illustrated in FIG. 4.

Communication circuit 80b includes an antenna and a wireless module, for instance, and communicates with lighting fixture L11 by radio r2. Communication circuit 80b communicates with setting device 90 by radio r3.

Controller 80c includes CPU, RAM, and ROM, for instance. The communication address of lighting controller 81A is stored in controller 10c. Controller 80c obtains the communication address of lighting fixture L11 via communication circuit 80b, and thereafter returns the own communication address to lighting fixture L11 to be paired with lighting fixture L11.

Setting device 90 is a tablet terminal or a smartphone, for example. Setting device 90 includes controller 90c, and communication circuit 90a, communication circuit 90b, display 90d, and detector 90e which are connected to controller 90c, as illustrated in FIGS. 3C and 4. Display 90d of setting device 90 is, for example, a touch panel, and includes indicator 90f, setting input receiver 90g, position input receiver 90h, and correction input receiver 90i.

Communication circuit 90a is an infrared-ray transmitter, for example, and communicates, by radio r1, with one target lighting fixture (for example, lighting fixture L11) in which a communication configuration is to be set up among plural lighting fixtures L.

Communication circuit 90b includes an antenna and a wireless module, for instance, and communicates with lighting controller 81A by radio r3.

Display 90d displays layout information of lighting fixture L and lighting controllers 81A and 82A, as illustrated in FIG. 3C. Layout information is map information indicating an indoor disposition relation of lighting fixtures L and lighting controllers 81A and 82A, for example. As the layout information, marks corresponding to lighting fixtures L one-to-one are displayed on display 90d. The marks show identification information corresponding to lighting fixtures L one-to-one. For example, a square mark is displayed on display 90d at the position corresponding to the position of lighting fixture L11 inside of a building, and identification information "11" which indicates lighting fixture L11 is displayed within the mark. The identification information is a user-determined simple number, text, or sign for distinguishing one lighting fixture L from other lighting fixtures L.

Detector 90e is a sensor module which detects the direction of movement and the amount of movement of setting device 90 inside of a building. Detector 90e includes a magnetic field sensor and an acceleration sensor, for example. Detector 90e detects the current orientation of setting device 90 using the magnetic field sensor, and detects the amount of movement of setting device 90 from a movement reference position using the acceleration sensor. In FIG. 3C, the orientation of setting device 90 is toward the apex of the isosceles triangle illustrated on the right of the casing of setting device 90. The movement reference position for calculating the amount of movement of setting device 90 is a position input via position input receiver 90h later described.

Controller 90c includes CPU, RAM, and ROM, for instance. The layout information and the identification information of lighting fixtures L are stored in controller 90c. The communication address of setting device 90 and the communication addresses of lighting controllers 81A and 82A are stored in controller 90c. A program for setting up a communication configuration mentioned above is stored in controller 90c. The program is stored in a computer-readable recording medium, for example.

Controller 90c derives the current position of setting device 90 by computation based on the direction of movement and the amount of movement detected by detector 90e, and causes display 90d to display the layout information and the derived position of setting device 90 in such a manner that the derived position is superimposed on the layout information.

Figure 5:
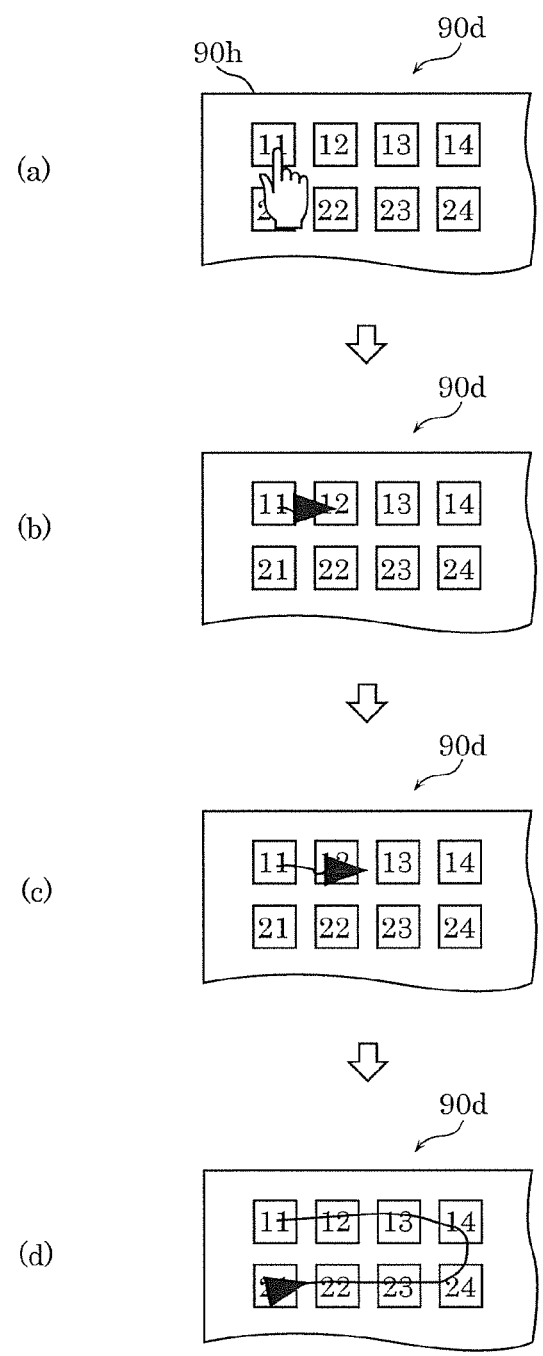
FIG. 5 illustrates a position, an orientation, and a trajectory of the setting device which are displayed on a display of the setting device according to Embodiment 1.

FIG. 5 illustrates a position, an orientation, and a trajectory of setting device 90 displayed on display 90d. In FIG. 5, the position of setting device 90 is indicated by the tip of the arrow within display 90d, the orientation of setting device 90 is indicated by the direction at which the arrow points, and the trajectory of setting device 90 is indicated by the course from a movement reference position to the current position. Note that the movement reference position is input by touching a certain position on position input receiver 90h of display 90d, as illustrated in (a) of FIG. 5. The input movement reference position is stored in controller 90c described above.

As illustrated in FIG. 3C, controller 90c causes display 90d to display target lighting fixture L11 in which is a communication configuration is to be set up, and predefined area T1 based on the location of lighting fixture L11. When the communication configuration is set up using setting device 90, predefined area T1 is an area determined to prevent the communication configuration from being set up in a lighting fixture which is not a target lighting fixture, so that the communication configuration cannot be set up outside of predefined area T1. Predefined area T1 is indicated by the broken line circle in FIG. 3C, and is determined to be an area within a one-meter radius from the center position of lighting fixture L11, for example.

Controller 90c determines whether the position of setting device 90 is within predefined area T1, based on the location of target lighting fixture L11. Specifically, controller 90c determines whether the tip of the arrow indicating setting device 90 displayed on display 90d is located within predefined area T1. When the position of setting device 90 is within predefined area T1, controller 90c causes indicator 90f to notify that setting device 90 is at a position where the communication configuration can be set up in lighting fixture L11. The method of causing indicator 90f to give a notification is described below.

Controller 90c causes display 90d to display setting input receiver 90g for setting up the communication configuration when the position of setting device 90 is within predefined area T1. Controller 90c sets up a communication configuration as described above upon receiving an input regarding the communication configuration from setting input receiver 90g.

At that time, controller 90c transmits information to be used for pairing and mapping to lighting fixture L11. Specifically, controller 90c transmits, to lighting fixture L11, the communication address of lighting controller 81A which is a pairing partner, and transmits identification information "11" of lighting fixture L11 indicated by layout information.

Accordingly, in lighting system 100, controller 90c determines whether the position of setting device 90 is within predefined area T1 of target lighting fixture L11 in which a communication configuration is to be set up, and sets up the communication configuration if the position of setting device 90 is within predefined area T1. Accordingly, the communication configuration can be reliably set up in target lighting fixture L11.

[3. Method for Setting Up Communication Configuration in Lighting Fixtures]

Figure 6:
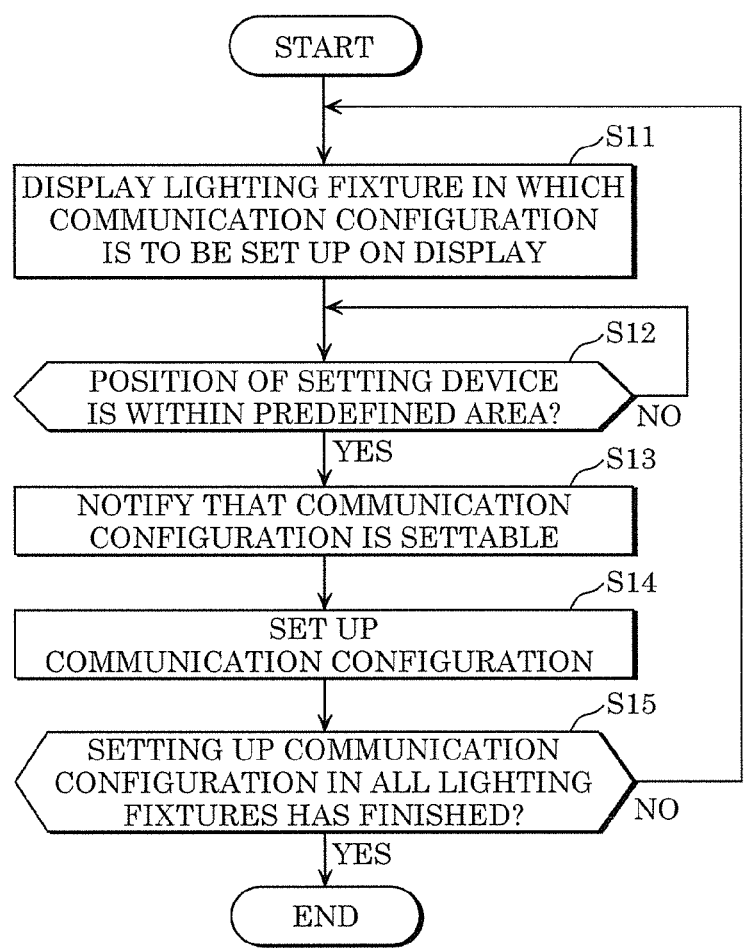
FIG. 6 is a flowchart illustrating a method for setting up a communication configuration in the lighting fixtures according to Embodiment 1.
Figure 7A:
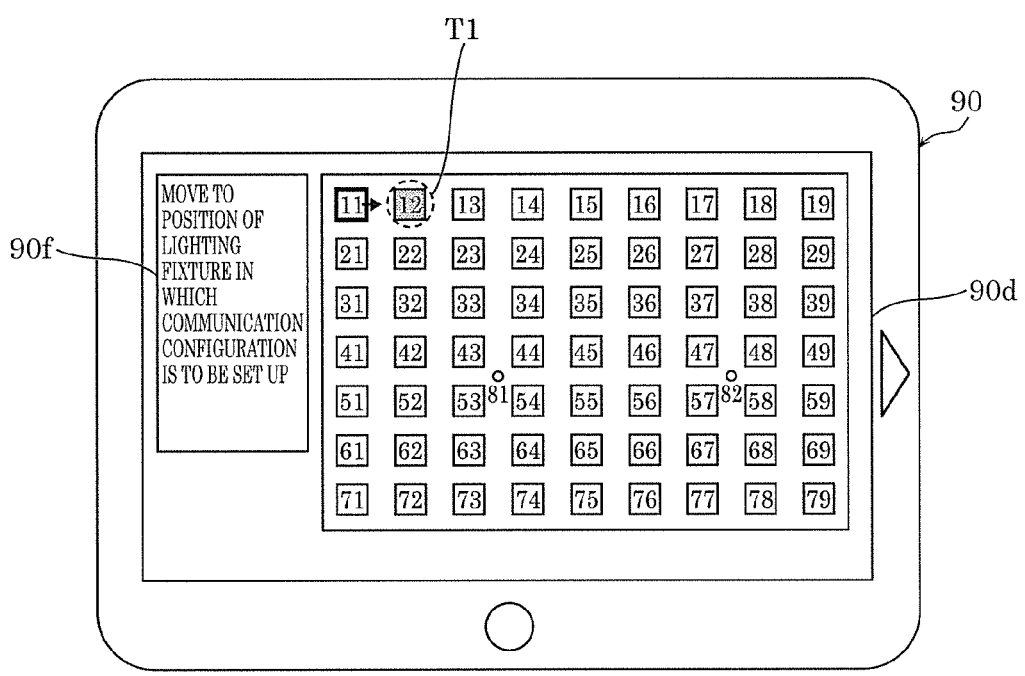
FIG. 7A illustrates an example of an image displayed on the setting device according to Embodiment 1.
Figure 7B:
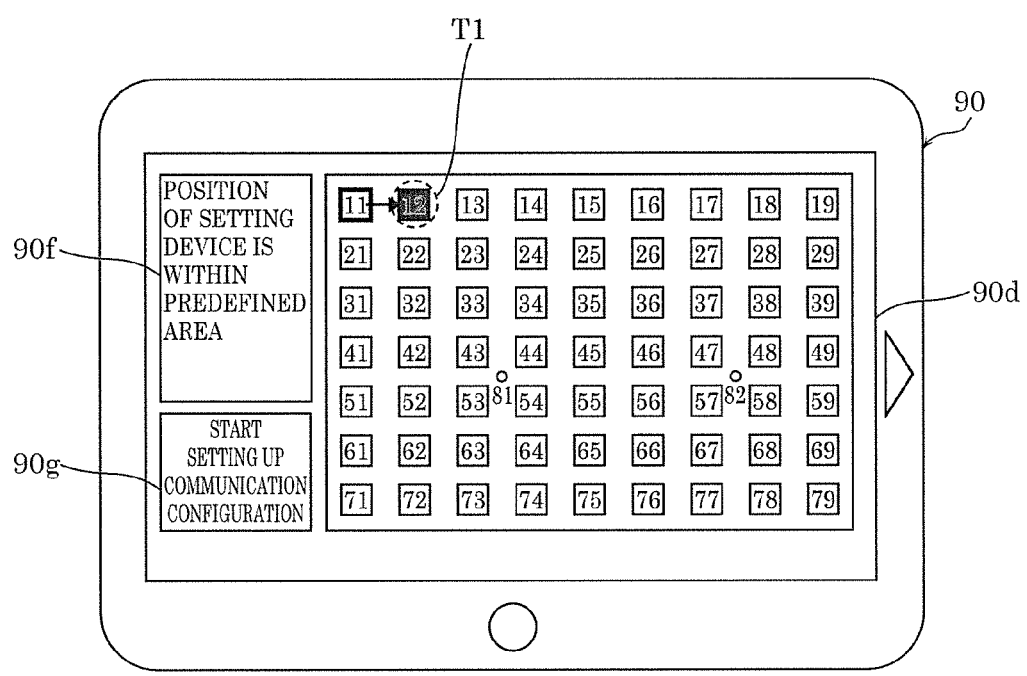
FIG. 7B illustrates an example of an image displayed on the setting device according to Embodiment 1, subsequently to FIG. 7A.
Figure 7C:
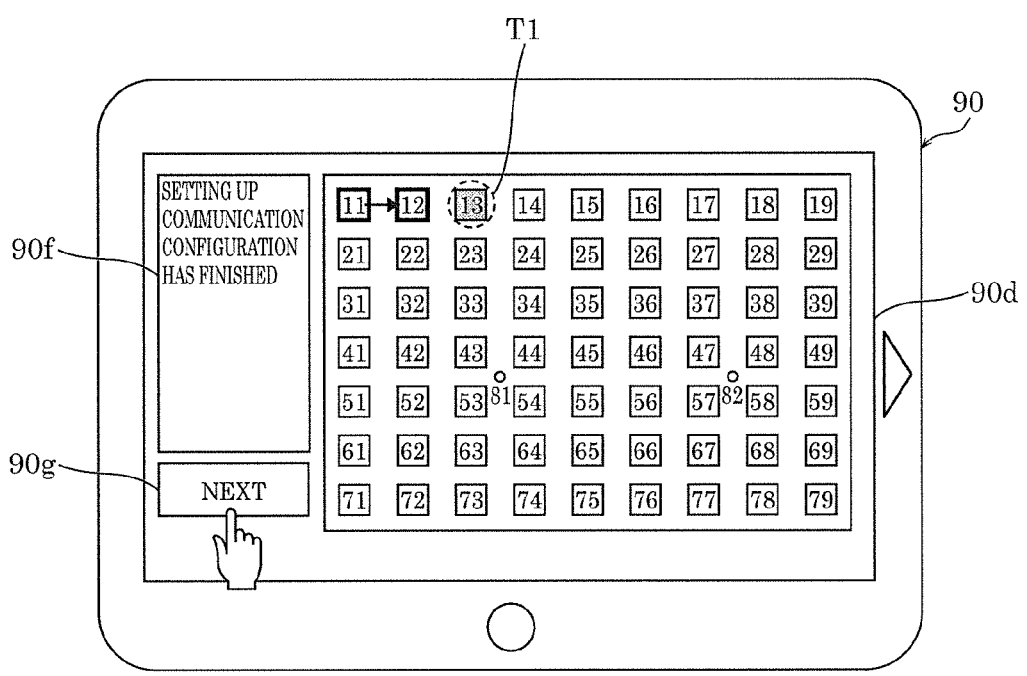
FIG. 7C illustrates an example of an image displayed on the setting device according to Embodiment 1, subsequently to FIG. 7B.

The following describes a method of setting up a communication configuration in each of lighting fixtures L, with reference to FIG. 6 to FIG. 7C. FIG. 6 is a flowchart illustrating a method of setting up a communication configuration in lighting fixtures L. FIG. 7A illustrates an example of an image displayed on setting device 90. FIG. 7B illustrates an example of an image displayed on setting device 90, subsequently to FIG. 7A. FIG. 7C illustrates an example of an image displayed on setting device 90, subsequently to FIG. 7B.

Note that here, a situation in which setting up a communication configuration in lighting fixture L11 has finished, and a communication configuration in lighting fixture L12 which is the next target lighting fixture is to be set up, as illustrated in FIG. 7A. The current position of setting device 90 is displayed on display 90d in FIG. 7A.

First, controller 90c of setting device 90 causes display 90d to display target lighting fixture L12 in which a communication configuration is to be set up (S11). Specifically, controller 90c causes display 90d to display a mark labeled with identification information "12" corresponding to lighting fixture L12 in a color different from the color of marks labeled with other identification information. Controller 90c causes display 90d to further display predefined area T1 indicated by the broken line circle about the mark labeled with identification information "12".

Controller 90c causes indicator 90f included in display 90d to display a message for a user "MOVE TO POSITION OF LIGHTING FIXTURE IN WHICH COMMUNICATION CONFIGURATION IS TO BE SET UP". The user moves setting device 90 to the position immediately under lighting fixture L12 according to this message.

Next, controller 90c determines whether the position of setting device 90 is within predefined area T1 (S12). Specifically, controller 90c determines whether the tip of the arrow displayed on display 90d is within predefined area T1. If the position of setting device 90 is outside of predefined area T1, controller 90c maintains a standby state (NO in S12). If the position of setting device 90 is within predefined area T1 (YES in S12), controller 90c causes indicator 90f to notify the user that setting device 90 is at a position where the communication configuration can be set up (S13).

Specifically, as illustrated in FIG. 7B, controller 90c causes indicator 90f to indicate that the position of setting device 90 is within predefined area T1. In addition, controller 90c causes indicator 90f to display the square mark labeled with identification information "12" in a color different from the color of the mark displayed in step S11. Accordingly, controller 90c causes indicator 90f to notify that the position of setting device 90 is within predefined area T1.

Note that a notification given by indicator 90f is not limited to the output from display 90d on the screen. For example, indicator 90f may be a vibrator included in setting device 90. In that case, controller 90c causes the vibrator to vibrate when the position of setting device 90 is within predefined area T1. In addition, indicator 90f may be a speaker included in setting device 90. In that case, controller 90c causes the speaker to output sound when the position of setting device 90 is within predefined area T1.

In such manners, indicator 90f notifies the user of a position at which setting device 90 can set up a communication configuration, or in other words, notifies the user that if a communication configuration is set up at the present position, the communication configuration is less likely to be set up in a lighting fixture other than the target lighting fixture. In the above manner, when the position of setting device 90 is within predefined area T1, controller 90c may cause indicator 90f to emit light, vibrate, or output sound, before setting up the communication configuration.

When the position of setting device 90 is within predefined area T1, controller 90c causes display 90d to display setting input receiver 90g. After receiving an input regarding a communication configuration via setting input receiver 90g, controller 90c sets up a communication configuration (S14). Note that although the above is an example in which the communication configuration is set up after receiving an input via setting input receiver 90g, the present embodiment is not limited thereto. For example, controller 90c may automatically set up the communication configuration without a user operation when the position of setting device 90 is within predefined area T1.

When setting up the communication configuration, controller 90c transmits, to lighting fixture L12, information to be used for pairing and mapping. Specifically, controller 90c transmits, to lighting fixture L12, the communication address of lighting controller 81A which is a pairing partner. In addition, controller 90c transmits identification information "12" of lighting fixture L12 indicated by the layout information.

When lighting fixture L12 and lighting controller 81A are to be paired, lighting fixture L12 reads the communication address of its own, and transmits the own communication address to lighting controller 81A. Lighting controller 81A stores the received communication address of lighting fixture L12 into controller 80c, and transmits the own communication address to lighting fixture L12. In this manner, lighting fixture L12 and lighting controller 81A each store the communication address of the pairing partner, thus finishing the pairing.

When mapping is performed, lighting fixture L12 transmits, to lighting controller 81A, identification information "12" transmitted by setting device 90. Lighting controller 81A transmits to setting device 90 by radio r3 in a state in which received identification information "12" and the communication address of lighting fixture L12 are associated with each other. Controller 90c of setting device 90 obtains the communication address of lighting fixture L12 via communication circuit 90b, and associates the layout information indicating lighting fixture L12 and the communication address of lighting fixture L12. This finishes mapping.

After setting up the communication configuration in lighting fixture L12, controller 90c causes indicator 90f to display a message indicating that setting up the communication configuration has finished, as illustrated in FIG. 7C. Controller 90c changes how the mark labeled with identification information "12" is displayed, so that, for example, the displayed mark has an outer frame thicker than the frame displayed before the communication configuration is set up, as illustrated in FIG. 7C. If the "NEXT" button of setting input receiver 90g is pressed, controller 90c causes display 90d to display next target lighting fixture L13 in which the communication configuration is to be set up.

In the above manner, performing steps S11 to S14 for all lighting fixtures L (YES in S15) finishes setting up the communication configuration in all lighting fixtures L.

Note that if setting device 90 enters predefined area T1 of a lighting fixture (for example, lighting fixture L12) in which the communication configuration has been set up, controller 90c may cause, via communication circuit 90a, lighting fixture L12 in which the communication configuration has been set up to emit light or blink.

[4. Advantageous Effects and Others]

Setting device 90 according to the present embodiment is setting device 90 which sets up a communication configuration in each of lighting fixtures L disposed inside of a building, the setting device including: communication circuit 90a which communicates with a target lighting fixture (for example, lighting fixture L11) in which the communication configuration is to be set up, among lighting fixtures L; display 90d which displays layout information of lighting fixtures L; detector 90e which detects a direction of movement of setting device 90 inside of the building, and an amount of the movement of setting device 90 inside of the building; and controller 90c which causes display 90d to display, on the layout information displayed on display 90d, a position of setting device 90 derived based on the direction of the movement and the amount of the movement of setting device 90. Controller 90c determines whether the position of setting device 90 is within predefined area T1 that is defined, based on a location of lighting fixture L11 which is the target lighting fixture, and sets up the communication configuration in the target lighting fixture via communication circuit 90a when the position of setting device 90 is within predefined area T1.

Accordingly, controller 90c of setting device 90 determines whether the position of setting device 90 is within predefined area T1 of target lighting fixture L11 in which the communication configuration is to be set up and the communication configuration is set up when the position is within predefined area T1, whereby the communication configuration can be reliably set up in target lighting fixture L11.

Note that Embodiment 1 has described an example in which the position of setting device 90 is derived by controller 90c performing computation, yet the present disclosure is not limited to this. For example, setting device 90 may transmit information obtained by detector 90e to an external server, and use the value derived by the external server performing computation as the position of setting device 90.

Controller 90c may set up the communication configuration in lighting fixture L11 which is the target lighting fixture by transmitting, to the target lighting fixture via communication circuit 90a, a communication address of a lighting controller (for example, lighting controller 81A) which controls lighting fixture L11 and identification information of lighting fixture L11 indicated by the layout information.

In this manner, controller 90c informs lighting fixture L11 of the communication address of lighting controller 81A, thus pairing lighting fixture L11 with lighting controller 81A. Controller 90c informs lighting fixture L11 of the identification information described above, thus allowing controller 90c to obtain the communication address of lighting fixture L11 so that layout information indicating lighting fixture L11 and the communication address of lighting fixture L11 can be associated with each other.

Setting device 90 may further include: indicator 90f which notifies that setting device 90 is at a position where the communication configuration is settable. When the position of setting device 90 is within predefined area T1, controller 90c may cause indicator 90f to notify that setting device 90 is at a position where the communication configuration is settable, before setting up the communication configuration.

According to this, a user can be informed that setting device 90 is at a position where the communication configuration can be set up, and thus the communication configuration can be reliably set up in target lighting fixture L11.

When the position of setting device 90 is within predefined area T1, controller 90*c* may cause indicator 90*f* to produce at least one of light, vibration, and sound, before setting up the communication configuration.

According to this, the user can be informed that setting device 90 is at a position where the communication configuration can be set up, and thus the communication configuration can be reliably set up in target lighting fixture L11.

Indicator 90*f* may be included in display 90*d*, and when the position of setting device 90 is within predefined area T1, controller 90*c* may cause indicator 90*f* to display a predetermined message, before setting up the communication configuration.

According to this, the user can be visually informed that setting device 90 is at a position where the communication configuration can be set up, and thus the communication configuration can be reliably set up in target lighting fixture L11.

Indicator 90*f* may be included in display 90*d*, and when the position of setting device 90 is within predefined area T1, controller 90*c* may cause indicator 90*f* to display lighting fixture L11 which is the target lighting fixture differently from one or more remaining lighting fixtures (for example, lighting fixture L12) among lighting fixtures L, before setting up the communication configuration.

According to this, a user can be visually informed that setting device 90 is at a position where the communication configuration can be set up, and thus the communication configuration can be reliably set up in target lighting fixture L11.

Indicator 90*f* may be a vibrator, and when the position of setting device 90 is within predefined area T1, controller 90*c* may cause the vibrator to vibrate, before setting up the communication configuration.

According to this, a user can be informed by vibrations that setting device 90 is at a position where the communication configuration can be set up, and thus the communication configuration can be reliably set up in target lighting fixture L11.

Indicator 90*f* may be a speaker, and when the position of setting device 90 is within predefined area T1, controller 90*c* may cause the speaker to output sound, before setting up the communication configuration.

According to this, a user can be informed by sound that setting device 90 is at a position where the communication configuration can be set up, and thus the communication configuration can be reliably set up in target lighting fixture L11.

When the position of setting device 90 is within predefined area T1, controller 90*c* may cause, before setting up the communication configuration, display 90*d* to display setting input receiver 90*g* for setting up the communication configuration, and set up the communication configuration upon receiving an input regarding the communication configuration via setting input receiver 90*g*.

According to this, the user can be informed that setting device 90 is at a position where the communication configuration can be set up and can input the communication configuration, and thus the communication configuration can be reliably set up in target lighting fixture L11.

When the position of setting device 90 is within predefined area T1, controller 90*c* may automatically set up the communication configuration.

According to this, the communication configuration can be promptly set up in target lighting fixture L11.

Communication circuit 90*a* may communicate with lighting fixture L11 which is the target lighting fixture, using directional communication.

According to this, a signal regarding the communication configuration can be reliably transmitted to target lighting fixture L11.

Controller 90*c* may cause display 90*d* to display a trajectory and orientation of setting device 90, based on the direction of the movement and the amount of the movement of setting device 90.

According to this, the user can be informed of the position and the orientation of setting device 90 on the layout information, and thus the communication configuration can be reliably set up in target lighting fixture L11.

Detector 90*e* may include a magnetic sensor for detecting the direction of the movement, and an acceleration sensor for detecting the amount of the movement.

Detector 90*e* includes a magnetic sensor and an acceleration sensor, and thus the direction of movement and the amount of movement of setting device 90 can be accurately informed. Using the magnetic sensor and the acceleration sensor as detector 90*e* allows the position of setting device 90 to be detected even inside of a building, which is a difference from the case where the global positioning system (GPS) is used.

Setting device 90 may further include: position input receiver 90*h* for receiving an input of a position of setting device 90 inside of the building. Controller 90*c* may set the position input via position input receiver 90*h* as a movement reference position of setting device 90, and detector 90*e* may detect an amount of movement of setting device 90 from the movement reference position.

According to this, the position of setting device 90 can be accurately obtained, and thus the communication configuration can be reliably set up in target lighting fixture L11.

Lighting system 100 according to the present embodiment includes: lighting fixtures L disposed inside of a building; lighting controllers 81A and 82A which control lighting fixtures L; and setting device 90 which sets up a communication configuration in each of lighting fixtures L and lighting controllers 81A and 82A. Setting device 90 includes: communication circuit 90*a* which communicates with a target lighting fixture (for example, lighting fixture L11) in which the communication configuration is to be set up among lighting fixtures L; display 90*d* which displays layout information of lighting fixtures L; detector 90*e* which detects a direction of movement of setting device 90 inside of the building, and an amount of the movement of setting device 90; and controller 90*c* which causes display 90*d* to display a position of setting device 90 derived based on the direction of the movement and the amount of the movement of setting device 90. Controller 90*c* determines whether the position of setting device 90 is within predefined area T1 that is defined based on a location of lighting fixture L11 which is the target lighting fixture, and sets up the communication configuration in lighting fixture L11 which is the target lighting fixture via communication circuit 90*a* when the position of setting device 90 is within predefined area T1, and lighting fixture L11 which is the target lighting fixture in which the communication configuration is set up is paired with a lighting controller (for example, lighting controller 81A) which is a pairing partner among lighting controllers 81A and 82A.

According to this, in lighting system 100, controller 90*c* determines whether the position of setting device 90 is within predefined area T1 of target lighting fixture L11, and sets up the communication configuration when the position is within predefined area T1. Accordingly, the communication configuration can be reliably set up in target lighting fixture L11. Furthermore, lighting fixture L11 and lighting controller 81A can be reliably paired with each other.

After setting up the communication configuration, controller 90c may obtain a communication address of lighting fixture L11, and associate the layout information indicating lighting fixture L11 with the communication address.

Accordingly, controller 90c obtains the communication address of lighting fixture L11, after setting up the communication configuration, thus associating the layout information indicating lighting fixture L11 and the communication address of lighting fixture L11, or in other words, performing mapping.

When setting device 90 enters predefined area T1 of a lighting fixture (for example, lighting fixture L11) in which the communication configuration has been set up, controller 90c may cause lighting fixture L11 in which the communication configuration has been set up to emit light or blink, via communication circuit 90a.

According to this, the user can be visually informed of lighting fixture L11 in which the communication configuration has been set up, thus preventing the communication configuration from being redundantly set up.

A method for setting up a communication configuration in each of lighting fixtures L according to the present embodiment is a method for setting up, using setting device 90, a communication configuration in each of lighting fixtures L disposed inside of a building, the method including: displaying layout information of lighting fixtures L on setting device 90; detecting a direction of movement of setting device 90 inside of the building, and an amount of the movement of setting device 90; deriving a position of setting device 90, based on the direction of the movement and the amount of the movement of setting device 90, and displaying, on setting device 90, the position of setting device 90 derived; determining whether the position of setting device 90 is within predefined area T1 that is defined based on a location of a lighting fixture (for example, lighting fixture L11) which is a target lighting fixture in which the communication configuration is to be set up among lighting fixtures L; and setting up the communication configuration in lighting fixture L11 which is the target lighting fixture using setting device 90 after it is determined that the position of setting device 90 is within predefined area T1.

Accordingly, the method for setting up the communication configuration in each of lighting fixtures L includes determining whether the position of setting device 90 is within predefined area T1 of target lighting fixture L11 in which the communication configuration is to be set up, and setting up the communication configuration when the position is within predefined area T1, and thus the communication configuration can be reliably set up in target lighting fixture L11.

A recording medium according to the present embodiment is a computer-readable recording medium storing a program for causing a computer to execute the method for setting up the communication configuration in each of lighting fixtures L. Specifically, the recording medium according to the present embodiment is for setting up a communication configuration in each of lighting fixtures L disposed inside of a building and includes a program which includes: displaying layout information of lighting fixtures L on setting device 90; detecting a direction of movement of setting device 90 inside of the building, and an amount of the movement of setting device 90; deriving a position of setting device 90, based on the direction of the movement and the amount of the movement of setting device 90, and displaying, on setting device 90, the position of setting device 90 derived; determining whether the position of setting device 90 is within predefined area T1 that is defined based on a location of a lighting fixture (for example, lighting fixture L11) which is a target lighting fixture in which the communication configuration is to be set up among lighting fixtures L; and setting up the communication configuration in lighting fixture L11 which is the target lighting fixture using setting device 90 when the position of setting device 90 is within predefined area T1.

Variation 1 and Variation 2 of Embodiment 1

Variation 1 and Variation 2 of Embodiment 1 show aspects in which controller 90c of setting device 90 scrolls layout information according to the position of setting device 90 displayed on display 90d, and causes display 90d to display the scrolled layout information.

Figure 8:
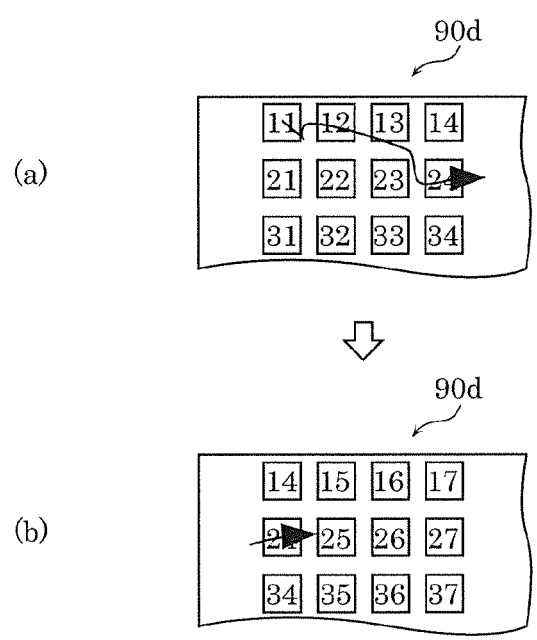
FIG. 8 illustrates examples of images displayed on a setting device according to Variation 1 of Embodiment 1.

FIG. 8 illustrates examples of images displayed on setting device 90 according to Variation 1 of Embodiment 1. In Variation 1, once the arrow displayed on display 90d reaches the right end of the image, as illustrated in (a) of FIG. 8, the arrow is displayed at the left end of the image together with layout information, as illustrated in (b) of FIG. 8.

Figure 9:
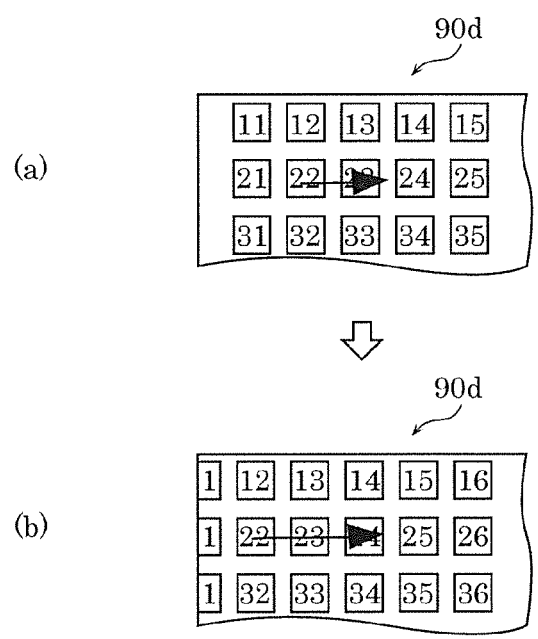
FIG. 9 illustrates examples of images displayed on a setting device according to Variation 2 of Embodiment 1.

FIG. 9 illustrates examples of images displayed on setting device 90 according to Variation 2 of Embodiment 1. In Variation 2, the arrow on display 90d is displayed so as to be always located in the center of the image when setting device 90 moves, as illustrated in (a) and (b) of FIG. 9.

Accordingly, controller 90c may scroll layout information according to the position of setting device 90 displayed on display 90d, and causes display 90d to display the scrolled layout information. This allows the position of setting device 90 on the layout information to be readily visually informed of a user, and thus a communication configuration can be reliably set up in target lighting fixture L11 in which the communication configuration is to be set up.

Embodiment 2

Embodiment 2 shows an aspect in which the movement reference position of setting device 90 is corrected. Setting device 90 in Embodiment 1 derives the position of setting device 90 from the direction of movement and the amount of movement of setting device 90 with respect to the movement reference position, yet if errors of data detected by detector 90e are accumulated, the position of setting device 90 may not be displayed accurately. In view of this, the movement reference position of setting device 90 displayed on display 90d is corrected according to the method described below.

Figure 10:
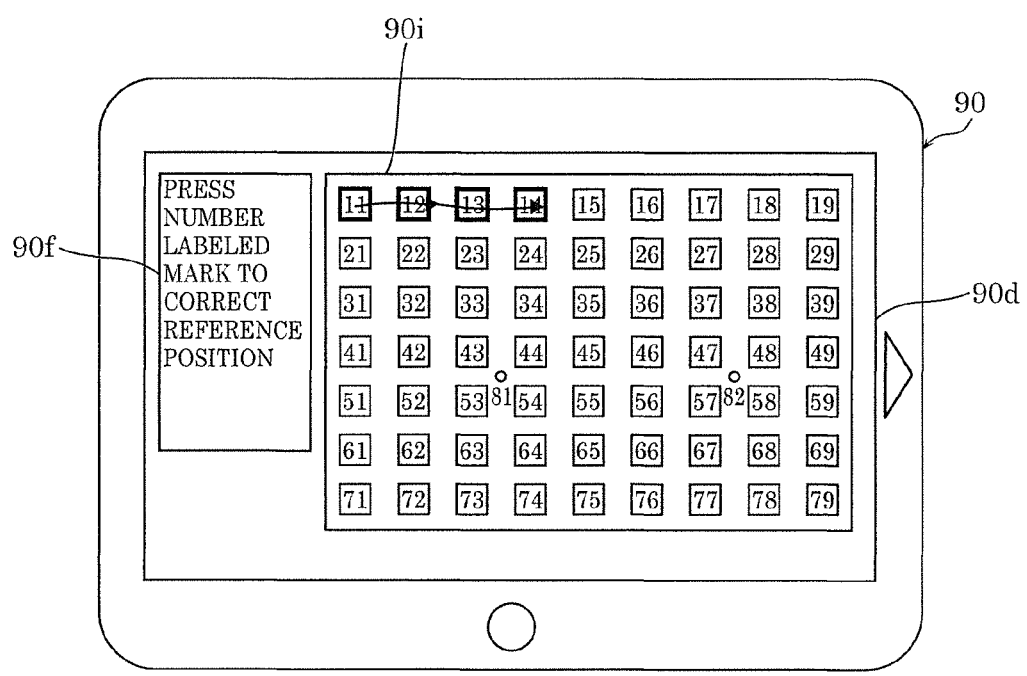
FIG. 10 illustrates an example of an image displayed to correct a movement reference position of a setting device according to Embodiment 2.

FIG. 10 illustrates an example of an image displayed to correct the movement reference position of setting device 90 according to Embodiment 2.

Controller 90c causes display 90d to display correction input receiver 90i for correcting the movement reference position of setting device 90 when the position of setting device 90 is within predefined area T1 described above. FIG. 10 illustrates the case where setting up the communication configuration in lighting fixture L14 has finished, and setting device 90 is within predefined area T1 of lighting fixture L14. Indicator 90f of display 90d shows a message which prompts correction of the movement reference position. For example, if a user touches a mark labeled with identification information "14" corresponding to lighting fixture L14, the movement reference position can be corrected to the touched position.

Figure 11:
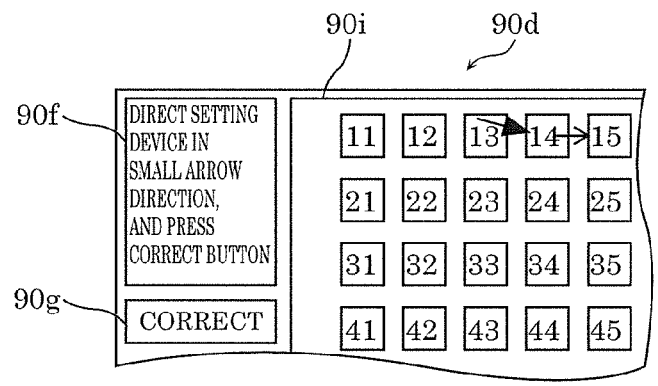
FIG. 11 illustrates an example of an image displayed to correct the orientation of the setting device according to Embodiment 2.

FIG. 11 illustrates an example of an image displayed to correct the orientation of setting device 90 according to Embodiment 2.

Controller 90c causes display 90d to display correction input receiver 90i for correcting the orientation of setting device 90 when the position of setting device 90 is within predefined area T1 described above. FIG. 11 illustrates the case where setting up a communication configuration in lighting fixture L14 has finished, and setting device 90 is within predefined area T1 of lighting fixture L14. Indicator 90f of display 90d shows a message which prompts correction of the orientation. For example, the user directs the orientation of setting device 90 in the same direction as the direction in which the small arrow on display 90d points and presses the "CORRECT" button (setting input receiver 90g), whereby the orientation of setting device 90 can be corrected.

Controller 90c in Embodiment 2 causes display 90d to display correction input receiver 90i for correcting the movement reference position of setting device 90 when the position of setting device 90 is within predefined area T1. Accordingly, the movement reference position can be corrected using correction input receiver 90i. Thus, the position of setting device 90 can be accurately shown on display 90d, and the communication configuration can be reliably set up in a target lighting fixture (for example, lighting fixture L15) in which a communication configuration is to be set up next.

Note that controller 90c may cause display 90d to display a message which prompts correction of the movement reference position of setting device 90, after a predetermined time period has elapsed since the start of setting up the communication configuration. The predetermined time period is 10 minutes, for example. According to this, the movement reference position can be corrected periodically, and the position of setting device 90 can be shown accurately.

In addition, controller 90c may cause display 90d to display a message which prompts correction of the movement reference position of setting device 90, after setting up the communication configuration in a predetermined number of lighting fixtures has finished among plural lighting fixtures L. The predetermined number of lighting fixtures are ten lighting fixtures, for example. Accordingly, the movement reference position can be corrected for a predetermined number of times, so that the position of setting device 90 can be shown accurately.

Figure 12:
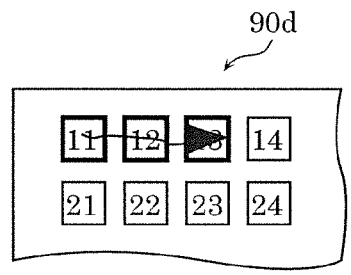
FIG. 12 illustrates another example of an image displayed on the setting device according to Embodiment 2.

As illustrated in FIG. 12, after finishing setting up the communication configuration, and further receiving a notification indicating that setting up the communication configuration has finished from a target lighting fixture (for example, lighting fixture L13) in which the communication configuration is to be set up, controller 90c may automatically correct the movement reference position of setting device 90. Thus, the movement reference position can be corrected frequently, so that the position of setting device 90 can be shown accurately.

Figure 13:
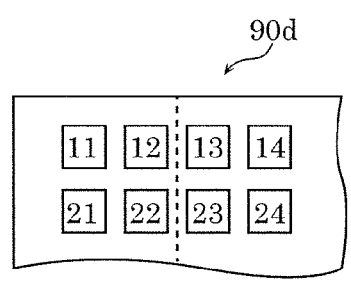
FIG. 13 illustrates a yet another example of an image displayed on the setting device according to Embodiment 2.

Controller 90c may cause display 90d to display lighting fixtures L with a region in which lighting fixtures L are disposed being partitioned into regions, and determine the movement reference position for each of the regions. In FIG. 13, for example, a region in which lighting fixtures L are disposed is partitioned into a region for lighting fixtures L11, L12, L21, and L22 and a region for lighting fixtures L13, L14, L23, and L24, and the movement reference position is determined for each of the two regions. This allows the movement reference position to be determined for each of the partitioned regions, and thus the position of setting device 90 can be accurately shown on display 90d.

Other Embodiments

Note that in Embodiment 1 and 2 above, each of the elements may be achieved by dedicated hardware, or may be obtained by executing a software program suitable for the element. Each element may be obtained by a program executer such as a CPU or a processor reading and executing a software program recorded on a recording medium such as a hard disk or semiconductor memory.

Furthermore, all the numerical values used above are examples in order to specifically describe the present disclosure, and thus the embodiments of the present disclosure are not limited to the exemplified numerical values.

The split into functional blocks in the block diagrams is an example, and plural functional blocks may be achieved as one functional block, one functional block may be split into plural blocks, or some of the functions may be transferred to another functional block. In addition, single hardware or software may achieve functions of plural functional blocks having similar functions, in parallel or in a time-dividing manner.

The orders of performing the steps in the flowcharts are examples to specifically describe the present disclosure, and thus may be the orders other than those. Some of the steps may be performed simultaneously with (in parallel to) other steps.

The scope of the present disclosure may also include embodiments as a result of adding, to Embodiments 1 and 2, various modifications that may be conceived by those skilled in the art, and embodiments obtained by combining elements and functions in Embodiments 1 and 2 in any manner as long as the combination does not depart from the scope of the present disclosure.

Embodiment 1 has described an example in which setting device 90 obtains the communication address of lighting fixture L12 via lighting controller 81A, yet the present disclosure is not limited thereto. For example, when setting device 90 transmits a signal to lighting fixture L12 by radio r1, setting device 90 may also transmit the communication address of setting device 90 in the signal, and lighting fixture L12 which has received the address may transmit the own communication address to setting device 90 by radio r2. Also in this example, layout information indicating lighting fixture L12 and the communication address of lighting fixture L12 can be associated with each other.

Note that Embodiment 1 has described an example in which lighting system 100 includes two lighting controllers 81A and 82A, yet the present disclosure is not limited thereto. For example, lighting system 100 may further include a master controller which manages plural lighting controllers 81A and 82A. In that case, the master controller and setting device 90 can communicate with each other by radio r3.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A setting device which sets up a communication configuration in each of lighting fixtures disposed inside of a building, the setting device comprising:
   a communication circuit which communicates with a target lighting fixture in which the communication configuration is to be set up, among the lighting fixtures;
   a display which displays layout information of the lighting fixtures;
   a detector which detects a direction of movement of the setting device inside of the building, and an amount of the movement of the setting device;
   a position input receiver for receiving an input of an initial position of the setting device inside of the building; and
   a controller which causes the display to display, on the layout information displayed on the display, a position of the setting device derived based on the direction of the movement and the amount of the movement of the setting device, wherein:
   the controller determines whether the position of the setting device is within a predefined area that is defined based on a location of the target lighting fixture, and sets up the communication configuration in the target lighting fixture via the communication circuit when the position of the setting device is within the predefined area,
   the controller sets the initial position via the position input receiver as a movement reference position of the setting device, and
   the detector detects the amount of movement of the setting device from the movement reference position.

2. The setting device according to claim 1, wherein the controller sets up the communication configuration in the target lighting fixture by transmitting, to the target lighting fixture via the communication circuit, a communication address of a lighting controller which controls the target lighting fixture and identification information of the target lighting fixture indicated by the layout information.

3. The setting device according to claim 1, further comprising:
   an indicator which notifies that the setting device is at a position where the communication configuration is settable, wherein
   when the position of the setting device is within the predefined area, the controller causes the indicator to notify that the setting device is at a position where the communication configuration is settable, before setting up the communication configuration.

4. The setting device according to claim 3, wherein
   when the position of the setting device is within the predefined area, the controller causes the indicator to produce at least one of light, vibration, and sound, before setting up the communication configuration.

5. The setting device according to claim 3, wherein
   the indicator is included in the display, and
   when the position of the setting device is within the predefined area, the controller causes the indicator to display a predetermined message, before setting up the communication configuration.

6. The setting device according to claim 3, wherein
   the indicator is included in the display, and
   when the position of the setting device is within the predefined area, the controller causes the indicator to display the target lighting fixture differently from one or more remaining lighting fixtures among the lighting fixtures, before setting up the communication configuration.

7. The setting device according to claim 3, wherein
   the indicator is a vibrator, and
   when the position of the setting device is within the predefined area, the controller causes the vibrator to vibrate, before setting up the communication configuration.

8. The setting device according to claim 3, wherein
   the indicator is a speaker, and
   when the position of the setting device is within the predefined area, the controller causes the speaker to output sound, before setting up the communication configuration.

9. The setting device according to claim 1, wherein
   when the position of the setting device is within the predefined area, the controller causes, before setting up the communication configuration, the display to display a setting input receiver for setting up the communication configuration, and sets up the communication configuration upon receiving an input regarding the communication configuration via the setting input receiver.

10. The setting device according to claim 1, wherein
    when the position of the setting device is within the predefined area, the controller automatically sets up the communication configuration.

11. The setting device according to claim 1, wherein
    the communication circuit communicates with the target lighting fixture, using directional communication.

12. The setting device according to claim 1, wherein
    the controller causes the display to display a trajectory and orientation of the setting device, based on the direction of the movement and the amount of the movement of the setting device.

13. The setting device according to claim 1, wherein
    the detector includes a magnetic sensor for detecting the direction of the movement, and an acceleration sensor for detecting the amount of the movement.

14. The setting device according to claim 1, wherein
    when the position of the setting device is within the predefined area, the controller causes the display to display a correction input receiver for correcting a movement reference position of the setting device.

15. The setting device according to claim 1, wherein
    the controller automatically corrects the movement reference position of the setting device after finishing setting up the communication configuration in the target lighting fixture and receiving, from the target lighting fixture, a notification indicating that setting up the communication configuration has finished.

16. The setting device according to claim 1, wherein
    the controller causes the display to display a message which prompts correction of the movement reference position of the setting device, after a predetermined time period has elapsed since start of setting up the communication configuration.

17. The setting device according to claim 1, wherein
    the controller causes the display to display a message which prompts correction of the movement reference position of the setting device, after setting up the communication configuration in a predetermined number of lighting fixtures among the lighting fixtures finishes.

18. The setting device according to claim 1, wherein
the controller causes the display to display the lighting fixtures with a region in which the lighting fixtures are disposed being partitioned into regions, and determines, for each of the regions, the movement reference position of the setting device.

19. The setting device according to claim 1, wherein
the controller scrolls the layout information, according to the position of the setting device displayed on the display, and causes the display to display the layout information scrolled.

20. A lighting system, comprising:
lighting fixtures disposed inside of a building;
lighting controllers which control the lighting fixtures; and
a setting device which sets up a communication configuration in each of the lighting fixtures and the lighting controllers, wherein
the setting device includes:
 a communication circuit which communicates with a target lighting fixture in which the communication configuration is to be set up among the lighting fixtures;
 a display which displays layout information of the lighting fixtures;
 a detector which detects a direction of movement of the setting device inside of the building, and an amount of the movement of the setting device;
 a position input receiver for receiving an input of an initial position of the setting device inside of the building, and
 a controller which causes the display to display a position of the setting device derived based on the direction of the movement and the amount of the movement of the setting device,
the controller determines whether the position of the setting device is within a predefined area that is defined based on a location of the target lighting fixture, and sets up the communication configuration in the target lighting fixture via the communication circuit when the position of the setting device is within the predefined area,
the controller sets the initial position via the position input receiver as a movement reference position of the setting device, and
the detector detects the amount of movement of the setting device from the movement reference position, and
the target lighting fixture in which the communication configuration is set up is paired with a lighting controller which is a pairing partner among the lighting controllers.

21. The lighting system according to claim 20, wherein
after setting up the communication configuration, the controller obtains a communication address of the target lighting fixture, and associates the layout information indicating the target lighting fixture with the communication address.

22. The lighting system according to claim 20, wherein
when the setting device enters the predefined area of the target lighting fixture in which the communication configuration has been set up, the controller causes the target lighting fixture to emit light or blink, via the communication circuit.

23. A method for setting up, using a setting device, a communication configuration in each of lighting fixtures disposed inside of a building, the method comprising:
 displaying layout information of the lighting fixtures on the setting device;
 detecting a direction of movement of the setting device inside of the building, and an amount of the movement of the setting device;
 deriving a position of the setting device, based on the direction of the movement and the amount of the movement of the setting device, and displaying, on the setting device, the position of the setting device derived;
 determining whether the position of the setting device is within a predefined area that is defined based on a location of a target lighting fixture in which the communication configuration is to be set up among the lighting fixtures; and
 setting up the communication configuration in the target lighting fixture using the setting device after it is determined that the position of the setting device is within the predefined area,
wherein the method further comprises:
 receiving an input of an initial position of the setting device inside of the building;
 setting the initial position as a movement reference position of the setting device; and
 detecting the amount of movement of the setting device from the movement reference position.

24. A non-transitory computer-readable recording medium storing a program for causing a computer to execute the method according to claim 23.

* * * * *